United States Patent
Eberhard et al.

(10) Patent No.: US 9,767,116 B1
(45) Date of Patent: Sep. 19, 2017

(54) OPTIMIZED OBJECT STATUS CONSISTENCY WITHIN CLUSTERED FILE SYSTEMS

(71) Applicant: International Business Machines Corporation, Armonk, NY (US)

(72) Inventors: Ralf Eberhard, Mainz (DE); Erik Rueger, Ockenheim (DE); Rolf Schaefer, Mainz (DE); Christof Schmitt, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/334,798

(22) Filed: Oct. 26, 2016

(51) Int. Cl.
*G06F 17/30* (2006.01)

(52) U.S. Cl.
CPC .. *G06F 17/30174* (2013.01); *G06F 17/30194* (2013.01)

(58) Field of Classification Search
None
See application file for complete search history.

(56) References Cited

U.S. PATENT DOCUMENTS

| | | | | |
|---|---|---|---|---|
| 6,725,235 B1 * | 4/2004 | Dyer | | G06F 17/5009 707/999.1 |
| 7,120,690 B1 * | 10/2006 | Krishnan | | G06F 17/30575 707/999.2 |
| 8,140,622 B2 | 3/2012 | Curran et al. | | |
| 9,165,157 B2 | 10/2015 | Georgiev | | |
| 2004/0230903 A1 * | 11/2004 | Elza | | G06F 17/2241 715/234 |
| 2015/0331902 A1 | 11/2015 | Verma et al. | | |
| 2016/0070481 A1 | 3/2016 | Barton et al. | | |

FOREIGN PATENT DOCUMENTS

| | | |
|---|---|---|
| CN | 105323723 A | 2/2016 |
| JP | 5685169 B2 | 3/2015 |
| RU | 2580425 C1 | 4/2016 |

OTHER PUBLICATIONS

"Synchronizing Updates to Meta Data Shared Between Many Clusters", Disclosed Anonymously, An IP.com Prior Art Database Technical Disclosure, IPCOM000208335D, Jul. 4, 2011, 4 pages.
Baker, Jason et al., "Megastore: Providing Scalable, Highly Available Storage for Interactive Services", CIDR, 5th Biennial Conference on Innovative Data Systems Research (CIDR '11), Asilomar, California, Jan. 9-12, 2011, pp. 223-234.

* cited by examiner

*Primary Examiner* — Son T Hoang
(74) *Attorney, Agent, or Firm* — Francis Lammes; Stephen J. Walder, Jr.; Randall J. Bluestone (57) ABSTRACT

Responsive to receiving an identification of a new state identifier associated with the state of an object within a file from a child node, a master node updates a current state identifier for the object to the new state identifier in the master node. Responsive to a predefined user specification indicating that the new state identifier is to be broadcast to each remaining child node of a subset of child nodes in a plurality of child nodes that have a copy of the object, the master node identifies the subset of child nodes in the plurality of child nodes that have a copy of the object in the master node. The master node then broadcasts the new state identifier to the subset of child nodes that have a copy of the object.

12 Claims, 4 Drawing Sheets

OPTIMIZED OBJECT STATUS CONSISTENCY WITHIN CLUSTERED FILE SYSTEMS

BACKGROUND

The present application relates generally to an improved data processing apparatus and method and more specifically to mechanisms for optimizing object status consistency within clustered file systems.

A clustered file system is a file system which is shared by being simultaneously mounted on multiple servers. There are several approaches to clustering, most of which do not employ a clustered file system (only direct attached storage for each node). Clustered file systems provide features like location-independent addressing and redundancy which improve reliability or reduce the complexity of the other parts of the cluster. Parallel file systems, such as the General Parallel File System (GPFS™) developed by IBM®, are a type of clustered file system that spreads files across multiple storage nodes, usually for redundancy or performance.

The GPFS™ is a high-performance clustered file system that can be deployed in shared-disk or shared-nothing distributed parallel modes. GPFS™ provides high performance by allowing files to be accessed over multiple computers at once. Most existing file systems are designed for a single server environment, and adding more file servers does not improve performance. GPFS™ provides higher input/output performance by "striping" blocks of data from individual files over multiple disks, GPFS™ reading and writing these blocks of data in parallel. Other features provided by GPFS™ include high availability, support for heterogeneous clusters, disaster recovery, security, Data Management Application Programming Interface (DMAPI), Hardware Security Module (HSM), and Information Lifecycle Management (ILM).

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for optimizing object status consistency within the clustered file system. The illustrative embodiment updates, in a master node, a current state identifier for the object to the new state identifier in response to receiving an identification of a new state identifier associated with the state of an object within a file from a child node. The illustrative embodiment identifies, in the master node, the subset of child nodes in the plurality of child nodes that have a copy of the object in response to a predefined user specification indicating that the new state identifier is to be broadcast to each remaining child node of a subset of child nodes in a plurality of child nodes that have a copy of the object. The illustrative embodiment then broadcasts, from the master node, the new state identifier to the subset of child nodes that have a copy of the object.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide mechanisms for optimizing object status consistency within clustered file systems. As noted above, on large clustered file systems, metadata is transferred between the various nodes of the clustered system, therefore bandwidth and latency is limited. A file that is written to the clustered file system is broken up into blocks of a configured size (referred to hereafter as objects), typically less than 1 megabyte each. These objects are distributed across multiple nodes of the clustered file system, so that a single file is fully distributed across the nodes. This results in high reading and writing speeds for a single file, as the combined bandwidth of the many physical drives of the disk arrays in the nodes is high. However, this makes the filesystem vulnerable to disk failures as any one disk failing would be enough to lose data. To prevent data loss, the nodes of the clustered file system have redundant array of independent disks (RAID) controllers, where multiple copies of each object are written to the physical disks on the individual nodes. Thus, when an object is changed on one node of the clustered file system, the state of the changed object is communicated to each node of the clustered file system. Currently, this is performed by sharing the individual status of each object by exchanging metadata of an object with each node of the clustered file system. Performing a status change responsive to an object change, even when the object is less than 1 megabyte in size, introduces a performance issue on high-frequented pools with small sizes of objects.

Therefore, the illustrative embodiments provide performance enhancement mechanisms for optimizing object status consistency within clustered file systems. The performance enhancement mechanisms improve the performance of the cluster intercommunication process by sending only a state identifier of an object instead of the object metadata changes. That is, each object of has a finite number of states and thus, the performance enhancement mechanisms interprets object metadata as an plurality of different states. Accordingly, when an object is created or changed, the object metadata is equivalent to a state change. For example, if a state of an object is defined by five parameters and each parameter can have up to four values, then the total number of states for the object would be 1024 states.

Any time a state change of an object occurs at any node, a master node is informed of the state change. The master node comprises all the states for the object and updates its state of the object based on the state change. The master node also has a record of a subset of nodes in the plurality of nodes that have a copy of the object. Therefore, when the master node updates the state of the object, then master node broadcasts the state change to the subset of nodes that have a copy of the object. If any node in the subset of nodes does not comprise a state identifier related to the state change for the object, the node requests the associated object including the state identifier from the master node and updates an index of state identifiers to reflect the existence of the new state contained therein, thereby being a self-learning node. As long as a node in the subset of nodes has the state identifier indicated by the master node, the node updates the state identifier associated with the object to the indicated state identifier.

In another embodiment, rather than the master node transmitting the state change of an object to the subset of nodes upon receiving the indication from the state change from a particular node, the master node may transmit the state change to each of the subset of nodes only when a node requests the state of the object. For example, once a node makes the master node aware of the state change of an object, the master node updates its state index associated with the object to the new state identifier. Then, when a node in the subset of nodes that have a copy of the object receives a change to the object, before reflecting the new state change to the object, the node requests the current state identifier from the master node. If the state identifier received from the master node matches the new state of the object, then the node merely updates its state index associated with the object to the new state identifier. If the state identifier from the master node differs from the new state of the object, the node transmits the state change to the master node and the master node updates its state index associated with the object to the new state identifier.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 1:
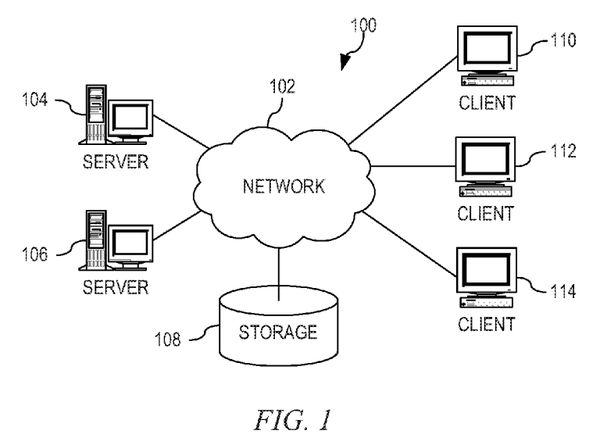
FIG. 1 is an example diagram of a distributed data processing system in which aspects of the illustrative embodiments may be implemented.
Figure 2:
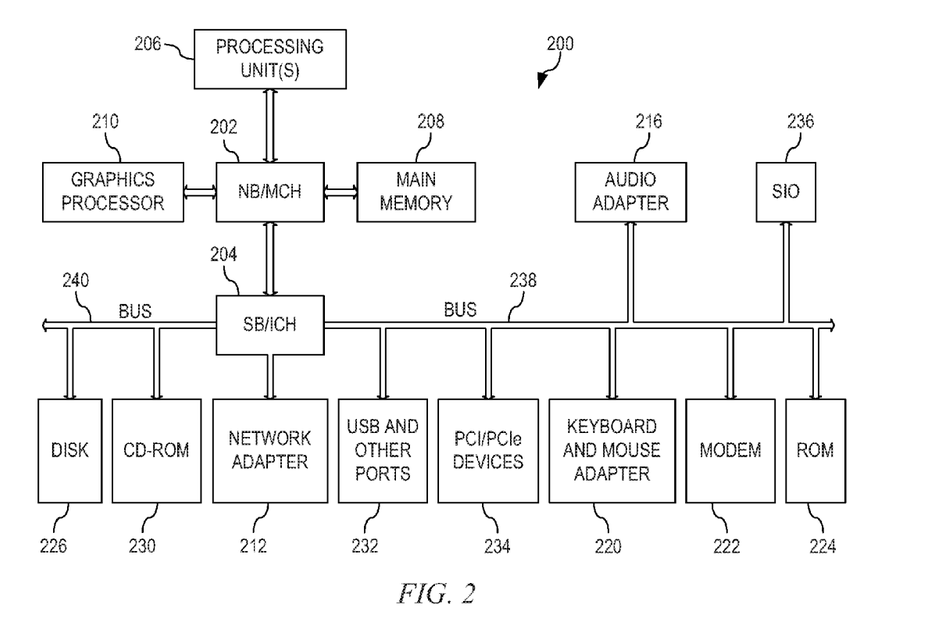
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement a performance enhancement mechanism for optimizing object status consistency within clustered file systems. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates optimizing object status consistency within clustered file systems.

As noted above, the mechanisms of the illustrative embodiments utilize specifically configured computing devices, or data processing systems, to perform the operations for optimizing object status consistency within clustered file systems. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System P® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the optimizing object status consistency within clustered file systems.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
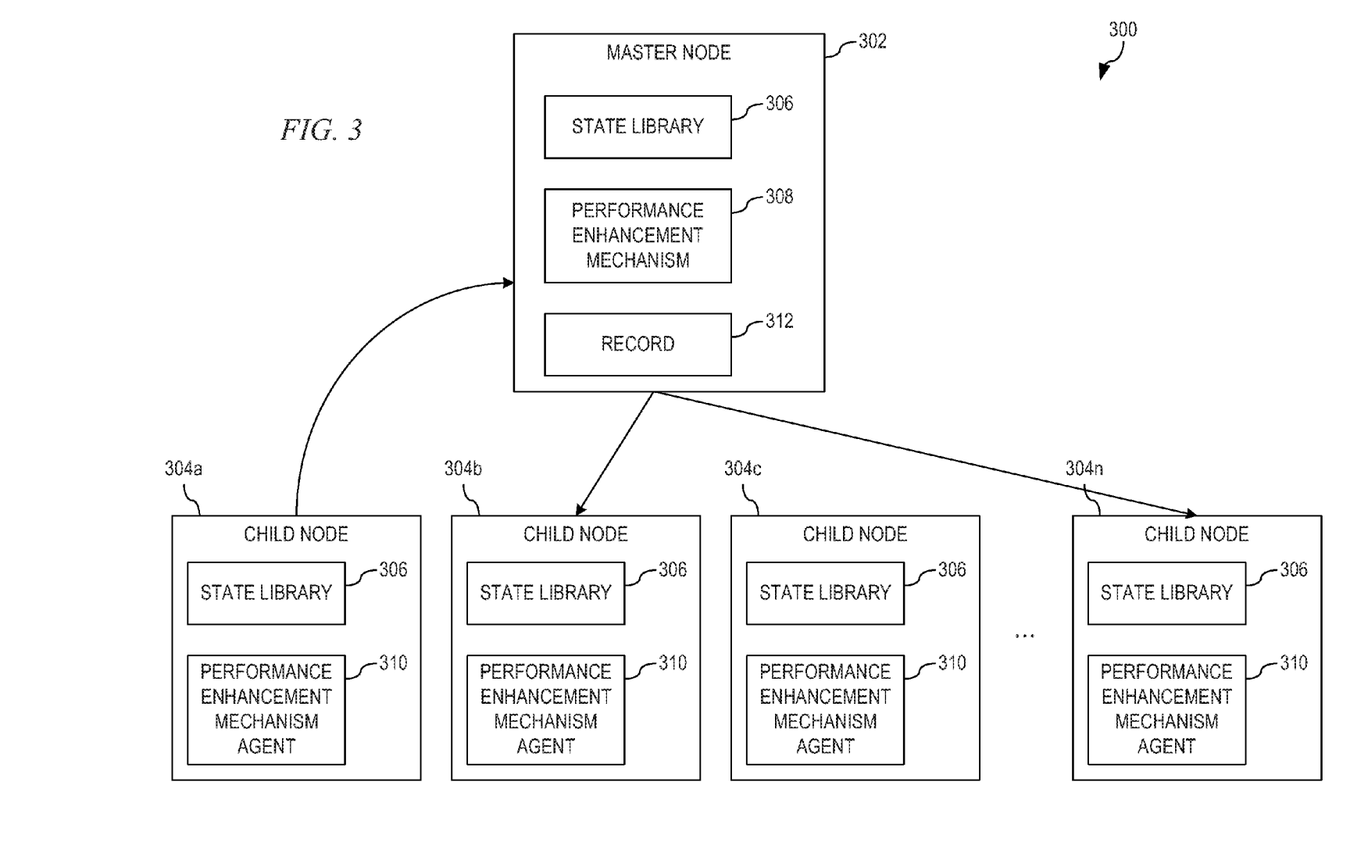
FIG. 3 depicts a functional block diagram of a performance enhancement mechanism for optimizing object status consistency within clustered file systems in accordance with an illustrative embodiment.

FIG. 3 depicts a functional block diagram of a performance enhancement mechanism for optimizing object status consistency within clustered file systems in accordance with an illustrative embodiment. Clustered file system 300, which may be a data processing system such as distributed data processing system 100 of FIG. 1 or data processing system 200 of FIG. 2, comprises master node 302 and a plurality of child nodes 304a-304n coupled to master node 302. Each child node in the plurality of child nodes 304a-304n as well as master node 302 comprises a state library 306. Each state library 306 includes a plurality of states for each object in a set of objects for each file in a set of files included in the respective child node in the plurality of child nodes 304a-304n or master node 302. While each state library 306 in the plurality of child nodes 304a-304n may include all previously encountered states for each object, the previously encountered states may not be all known states for the object. That is, each object of has a finite number of states. Therefore, as an example, if a state of an object is defined by five parameters and each parameter has up to four values, then the total number of states for the object would be 1024 states. However, an object may only change between a subset of the 1024 states and thus, each state library 306 in a particular child node may comprise a subset of the 1024 state that are most frequently utilized within the particular child node in the plurality of child nodes 304a-304n, i.e. all previously encountered stated. Whereas, the state library 306 in master node 302 comprises all known states for the object. As will be evident in the following description, state library 306 in master node 302 comprises the largest subset of states for the object since, each time an object changes state, the state change is relayed to master node 302.

In order to improve the performance of the cluster intercommunication process by sending only a state identifier of an object instead of complete object metadata changes, master node 302 comprises performance enhancement mechanism 308 which sends and receives communications to and from performance enhancement mechanism agents 310 within each of the plurality of child nodes 304a-304n. In order to describe how performance enhancement mechanism 308 within master node 302 operates with one or more performance enhancement mechanism agents 310 within a subset of child nodes from the plurality of child nodes 304a-304n when a state change of an object occurs at any child node, the following is provided as an example.

In the example, when a file is accessed on child node 304a and the file access changes the state of an object within the file, performance enhancement mechanism agent 310 within child node 304a attempts to identify a state identifier associated with the new state of the object from its state library 306. Responsive to performance enhancement mechanism agent 310 within child node 304a identifying the state identifier associated with the new state of the object from its state library 306, performance enhancement mechanism agent 310 within child node 304a updates a current state identifier for the object to the newly identified state identifier. Performance enhancement mechanism agent 310 within child node 304a then sends the state identifier to performance enhancement mechanism 308 within master node 302. Based on the provided state identifier, performance enhancement mechanism 308 within master node 302 updates its current state identifier for the object to the newly identified state identifier.

Responsive to performance enhancement mechanism agent 310 within child node 304a failing to identify the state identifier associated with the new state of the object from its state library 306, performance enhancement mechanism agent 310 requests the state identifier and the object associated with the state identifier from performance enhancement mechanism 308 within master node 302. Upon receiving the request, performance enhancement mechanism 308 within master node 302 sends the state identifier and the associated object in that state to the performance enhancement mechanism agent 310 in the child node 304a. The performance enhancement mechanism agent 310 stores the new state identifier in its state library 306, stores the object in that state in its local storage, and updates a current state identifier for the object to the newly identified state identifier.

Performance enhancement mechanism 308 within master node 302 then determines whether the a predefined user specification indicates that the new state identifier is to be broadcast to each remaining child node of a subset of child nodes in the plurality of nodes 304b-304n that have a copy of the object resident in the respective child node. If the predefined user specification indicates that the new state identifier is to be broadcast to each remaining child node of the subset of child nodes in the plurality of child nodes 304b-304n that have a copy of the object resident in the respective child node, performance enhancement mechanism 308 references record 312 that indicates the subset of child nodes in the plurality of child nodes 304a-304n that have a copy of the object. Based on the identified subset of child nodes that have a copy of the object minus the child node that reported the state change of the object, in this example child node 304a, performance enhancement mechanism 308 within master node 302 broadcasts the state identifier to the subset of child nodes that have a copy of the object.

If performance enhancement mechanism agent 310 in the receiving child node identifies the state identifier in its state library 306, then performance enhancement mechanism agent 310 updates a current state identifier for the object to the newly identified state identifier. If performance enhancement mechanism agent 310 in the receiving child node fails to identify the state identifier in its state library 306, performance enhancement mechanism agent 310 requests the state identifier and the object associated with the state identifier from performance enhancement mechanism 308 within master node 302. Upon receiving the request, performance enhancement mechanism 308 within master node 302 sends the state identifier and the associated object in that state to the performance enhancement mechanism agent 310 in the receiving child node. The performance enhancement mechanism agent 310 stores the state identifier in its state library 306, stores the object in that state in its local storage, and updates a current state identifier for the object to the newly identified state identifier.

If the predefined user specification indicates that the new state identifier is to be sent only on request from a child node of the subset of child nodes in the plurality of child nodes 304b-304n that have a copy of the object resident in the respective child node, then performance enhancement mechanism 308 within master node 302 transmits the state change to each of the subset of child nodes only when a child node requests the state of the object. Therefore, when a child node in the subset of child nodes in the plurality of child nodes 304b-304n that have a copy of the object receives a change to the object contained therein, before reflecting the new state change to the object, performance enhancement mechanism agent 310 within the child node requests the current state identifier from performance enhancement mechanism 308 within master node 302. Performance enhancement mechanism 308 within master node 302 then sends the state identifier to the requesting child node.

Responsive to receiving the state identifier, performance enhancement mechanism agent 310 checks to see whether the received state identifier is the same as its current state identifier for the object. If the received state identifier is the same as its current state identifier for the object, performance enhancement mechanism agent 310 terminates the operation. If the received state identifier fails to be the same as its current state identifier for the object, performance enhancement mechanism agent 310 in the child node determines whether the state identifier provided by performance enhancement mechanism 308 within master node 302 is in its state library 306. If performance enhancement mechanism agent 310 in the child node identifies the state identifier in its state library 306, then performance enhancement mechanism agent 310 updates a current state identifier for the object to the newly identified state identifier. If performance enhancement mechanism agent 310 in the child node fails to identify the state identifier in its state library 306, performance enhancement mechanism agent 310 requests the state identifier and the object associated with the state identifier from performance enhancement mechanism 308 within master node 302. Upon receiving the request, performance enhancement mechanism 308 within master node 302 sends the state identifier and the associated object in that state to the performance enhancement mechanism agent 310 in the receiving child node. The performance enhancement mechanism agent 310 stores the state identifier in its state library 306, stores the object in that state in its local storage, and updates a current state identifier for the object to the newly identified state identifier.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 4:
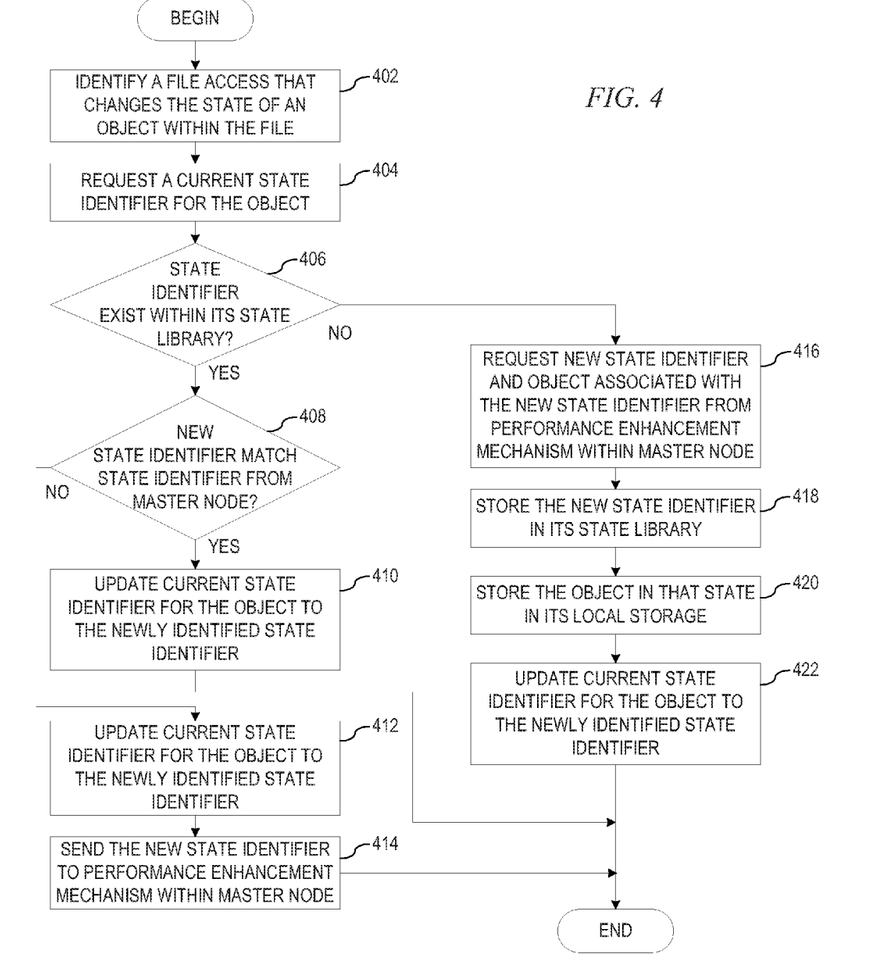
FIG. 4 depicts a flowchart of the operation performed by a performance enhancement mechanism agent within a child node of a clustered file system in response to a file access that changes the state of an object within the file in accordance with an illustrative embodiment.

FIG. 4 depicts a flowchart of the operation performed by a performance enhancement mechanism agent within a child node of a clustered file system in response to a file access that changes the state of an object within the file in accordance with an illustrative embodiment. As the operation begins, the performance enhancement mechanism agent identifies a file access that changes the state of an object within the file (step 402). The performance enhancement mechanism agent requests a current state identifier for the object from a performance enhancement mechanism within a master node (step 404). The performance enhancement mechanism agent determines whether a state identifier associated with the new state of the object resides within its state library (step 406). If at step 406 the performance enhancement mechanism agent identifies the state identifier associated with the new state of the object from its state library, the performance enhancement mechanism agent then determines whether the state identifier associated with the new state of the object matches the state identifier received from the performance enhancement mechanism within the master node (step 408).

If at step 408 the state identifier associated with the new state of the object matches the state identifier received from the performance enhancement mechanism within the master node, the performance enhancement mechanism agent updates a current state identifier for the object to the newly identified state identifier (step 410), with the operation ending thereafter. If at step 408 the state identifier associated with the new state of the object differs from the state identifier received from the performance enhancement mechanism within the master node, the performance enhancement mechanism agent updates a current state identifier for the object to the newly identified state identifier (step 412) and sends the new state identifier to the performance enhancement mechanism within the master node (step 414), with the operation ending thereafter.

If at step 406 the performance enhancement mechanism agent fails to identify the state identifier associated with the new state of the object from its state library, the performance enhancement mechanism agent requests the state identifier and the object associated with the new state identifier from the performance enhancement mechanism within the master node (step 416). By requesting the state identifier and the object associated with the new state identifier from the performance enhancement mechanism within the master node, the performance enhancement mechanism within the master node updates its state for the object to the requested identifier. Responsive to receiving the state identifier and the associated object in that state from the performance enhancement mechanism within the master node, the performance enhancement mechanism agent stores the state identifier in its state library (step 418), stores the object in that state in its local storage (step 420), and updates a current state identifier for the object to the newly identified state identifier (step 422), with the operation terminating thereafter.

Figure 5:
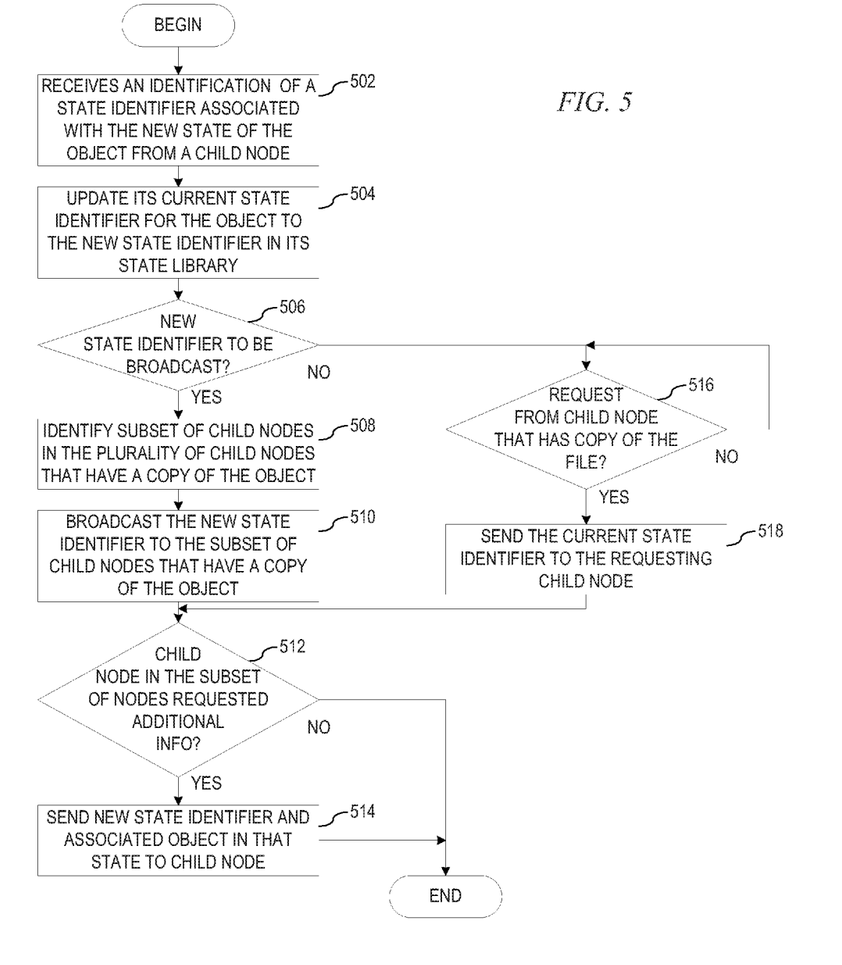
FIG. 5 depicts a flowchart of the operation performed by a performance enhancement mechanism within a master node of a clustered file system for optimizing object status consistency within the clustered file system in accordance with an illustrative embodiment.

FIG. 5 depicts a flowchart of the operation performed by a performance enhancement mechanism within a master node of a clustered file system for optimizing object status consistency within the clustered file system in accordance with an illustrative embodiment. As the operation begins, the performance enhancement mechanism of the master node receives an identification of a state identifier associated with the new state of the object from a child node (step 502). The performance enhancement mechanism within the master node updates its current state identifier for the object to the newly identified state identifier in its state library (step 504).

The performance enhancement mechanism within the master node then determines whether the a predefined user specification indicates that the new state identifier is to be broadcast to each remaining child node of a subset of child nodes in a plurality of nodes that have a copy of the object resident in the respective child node (step 506). If at step 506 the predefined user specification indicates that the new state identifier is to be broadcast to each remaining child node of the subset of child nodes in the plurality of child nodes that have a copy of the object resident in the respective child node, the performance enhancement mechanism references a record that indicates the subset of child nodes in the plurality of child nodes that have a copy of the object (step 508). Based on the identified subset of child nodes that have a copy of the object minus the child node that reported the state change of the object, the performance enhancement mechanism within the master node broadcasts the state identifier to the subset of child nodes that have a copy of the object (step 510).

The performance enhancement mechanism within the master node then determined whether any child node that received the broadcast has requested additional information (step 512). If at step 512 no child node that received the broadcast has requested additional information, the operation ends. If at step 512 one or more child nodes that received the broadcast request additional information, for each of the one or more nodes, the performance enhancement mechanism within the master node sends the state identifier and the associated object in that state to the performance enhancement mechanism agent in the receiving child node (step 514), with the operation ending thereafter.

If at step 506 the predefined user specification fails to indicate that the new state identifier is to be broadcast to each remaining child node of the subset of child nodes in the plurality of child nodes that have a copy of the object resident in the respective child node and instead indicates that the new state identifier is to be sent only on request from a child node of the subset of child nodes in the plurality of child nodes that have a copy of the object resident in the respective child node, then the performance enhancement mechanism within master node waits for a request from a child node that has a copy of the object resident in the respective child node (step 516). If at step 516 the performance enhancement mechanism within the master node receives a request from a child node, the performance enhancement mechanism within the master node sends the current state identifier to the requesting child node (step 518), with the operation returning to step 512 thereafter. If at step 516 the performance enhancement mechanism within the master node fails to receive a request from a child node, the operation returns to step 516.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for optimizing object status consistency within clustered file systems. The performance enhancement mechanisms improve the performance of the cluster intercommunication process by sending only a state identifier of an object instead of the object metadata changes. Any time a state change of an object occurs at any node, a master node is informed of the state change. The master node comprises all the states for the object and updates its state of the object based on the state change. The master node also has a record of a subset of nodes in the plurality of nodes that have a copy of the object. Therefore, when the master node updates the state of the object, then master node may broadcast the state change to the subset of nodes that have a copy of the object or provide the current state of the object upon request. If any node in the subset of nodes does not comprise a state identifier related to the state change for the object, the node requests the associated object including the state identifier from the master node and updates an index of state identifiers to reflect the existence of the new state contained therein, thereby being a self-learning node. As long as a node in the subset of nodes has the state identifier indicated by the master node, the node updates the state identifier associated with the object to the indicated state identifier.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless conununication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a clustered file system, for optimizing object status consistency within the clustered file system, the method comprising:
   responsive to receiving an identification of a new state identifier associated with a state of an object within a file from a child node, updating, in a master node, a current state identifier for the object to the new state identifier;
   responsive to a predefined user specification indicating that the new state identifier is to be broadcasted to each remaining child node of a subset of child nodes in a plurality of child nodes that each has a copy of the object, identifying, in the master node, the subset of child nodes in the plurality of child nodes that each has the copy of the object;
   broadcasting, from the master node, the new state identifier to the identified subset of child nodes; and
   wherein, upon each child node in the subset of child nodes receiving the new state identifier from the master node, the child node:
      determines whether the new state identifier exists within a state library in the child node;
      responsive to the new state identifier existing within the state library in the child node, updates a current state identifier, in the child node, for the object to the new state identifier;
      responsive to the new state identifier failing to exist within the state library in the child node, requests an object in the new state identified by the new state identifier from the master node and, responsive to receiving the object in the new state identified by the new state identifier from the master node:
         stores the new state identifier in the state library in the child node;
         stores the object in the new state identified by the new state identifier in a local storage of the child node; and
         updates the current state identifier, in the child node, for the object to the new state identifier.

2. The method of claim 1, further comprising:
   responsive to a predefined user specification indicating that the new state identifier is to be transmitted only at the request of a particular child node of a subset of child nodes in a plurality of child nodes that each has the copy of the object, waiting, in the master node, for a request from the particular child node to request the new state identifier; and
   responsive to receiving the request from the particular child node, transmitting, from the master node, the new state identifier to the particular child node, wherein, upon receiving the new state identifier, the particular child node updates a current state identifier for the object, in the particular child node, to the new state identifier.

3. The method of claim 1, wherein the master node comprises a state library that further comprises all known states for each object of a set of objects in each file of a set of files and wherein each known state in the state library has a state identifier.

4. The method of claim 1, wherein each child node in the plurality of child nodes has a state library that comprises states previously encountered by the child node.

5. A computer program product comprising a non-transitory computer readable storage medium having a computer readable program stored therein, wherein the computer readable program, when executed on a computing device, causes the computing device to:
   responsive to receiving an identification of a new state identifier associated with a state of an object within a file from a child node, update, in a master node, a current state identifier for the object to the new state identifier;
   responsive to a predefined user specification indicating that the new state identifier is to be broadcasted to each remaining child node of a subset of child nodes in a plurality of child nodes that each has a copy of the object, identify, in the master node, the subset of child nodes in the plurality of child nodes that each has the copy of the object;
   broadcast, from the master node, the new state identifier to the identified subset of child nodes; and
   wherein upon each child node in the subset of child nodes receiving the new state identifier from the master node, the computer readable medium causes the child node to:
      determine whether the new state identifier exists within a state library in the child node;
      responsive to the new state identifier existing within the state library in the child node, update a current state identifier, in the child node, for the object to the new state identifier;
      responsive to the new state identifier failing to exist within the state library in the child node, request an object in the new state identified by the new state identifier from the master node and, responsive to receiving the object in the new state identified by the new state identifier from the master node:
         store the new state identifier in the state library in the child node;
         store the object in the new state identified by the new state identifier in a local storage of the child node; and
         update the current state identifier, in the child node, for the object to the new state identifier.

6. The computer program product of claim 5, wherein the computer readable program further causes the computing device to:
- responsive to a predefined user specification indicating that the new state identifier is to be transmitted only at the request of a particular child node of a subset of child nodes in a plurality of child nodes that each has the copy of the object, wait, in the master node, for a request from the particular child node to request the new state identifier; and
- responsive to receiving the request from the particular child node, transmit, from the master node, the new state identifier to the particular child node, wherein, upon receiving the new state identifier, the particular child node updates a current state identifier for the object, in the particular child node, to the new state identifier.

7. The computer program product of claim 5, wherein the master node comprises a state library that further comprises all known states for each object of a set of objects in each file of a set of files and wherein each known state in the state library has a state identifier.

8. The computer program product of claim 5, wherein each child node in the plurality of child nodes has a state library that comprises states previously encountered by the child node.

9. An apparatus comprising:
- a processor; and a memory coupled to the processor, wherein the memory comprises instructions which, when executed by the processor, cause the processor to:
- responsive to receiving an identification of a new state identifier associated with a state of an object within a file from a child node, update, in a master node, a current state identifier for the object to the new state identifier;
- responsive to a predefined user specification indicating that the new state identifier is to be broadcasted to each remaining child node of a subset of child nodes in a plurality of child nodes that each has a copy of the object, identify, in the master node, the subset of child nodes in the plurality of child nodes that each has the copy of the object;
- broadcast, from the master node, the new state identifier to the identified subset of child nodes; and
- wherein upon each child node in the subset of child nodes receiving the new state identifier from the master node, the instructions cause the child node to:
  - determine whether the new state identifier exists within a state library in the child node;
  - responsive to the new state identifier existing within the state library in the child node, update a current state identifier, in the child node, for the object to the new state identifier;
  - responsive to the new state identifier failing to exist within the state library in the child node, request an object in the new state identified by the new state identifier from the master node and, responsive to receiving the object in the new state identified by the new state identifier from the master node:
    - store the new state identifier in the state library in the child node;
    - store the object in the new state identified by the new state identifier in a local storage of the child node; and
    - update the current state identifier, in the child node, for the object to the new state identifier.

10. The apparatus of claim 9, wherein the instructions further cause the processor to:
- responsive to a predefined user specification indicating that the new state identifier is to be transmitted only at the request of a particular child node of a subset of child nodes in a plurality of child nodes that each has the copy of the object, wait, in the master node, for a request from the particular child node to request the new state identifier; and
- responsive to receiving the request from the particular child node, transmit, from the master node, the new state identifier to the particular child node, wherein, upon receiving the new state identifier, the particular child node updates a current state identifier for the object, in the particular child node, to the new state identifier.

11. The apparatus of claim 9, wherein the master node comprises a state library that further comprises all known states for each object of a set of objects in each file of a set of files and wherein each known state in the state library has a state identifier.

12. The apparatus of claim 9, wherein each child node in the plurality of child nodes has a state library that comprises states previously encountered by the child node.

* * * * *